United States Patent [19]

Alexander et al.

[11] 3,817,050

[45] June 18, 1974

[54] TWO-STAGE AMMONIA ABSORPTION REFRIGERATION SYSTEM WITH AT LEAST THREE EVAPORATION STAGES

[75] Inventors: David L. Alexander, Fishkill; James R. Muenger, Beacon, both of N.Y.

[73] Assignee: Texaco Inc., New York, N.Y.

[22] Filed: Dec. 26, 1972

[21] Appl. No.: 317,904

[52] U.S. Cl. ............... 62/101, 62/476, 62/495, 62/497
[51] Int. Cl. ............................................ F25b 15/04
[58] Field of Search ............ 62/101, 109, 476, 495, 62/496, 497

[56] References Cited
UNITED STATES PATENTS

| 967,992 | 8/1910 | Starr | 62/496 X |
|---|---|---|---|
| 2,301,839 | 10/1942 | Work et al. | 62/109 |
| 2,650,480 | 9/1953 | Gilmore | 62/101 |
| 3,166,914 | 1/1965 | Hallat | 62/101 |
| 3,167,929 | 2/1965 | Rorschach | 62/101 |
| 3,273,350 | 9/1966 | Taylor | 62/101 |

*Primary Examiner*—William F. O'Dea
*Assistant Examiner*—Peter D. Ferguson
*Attorney, Agent, or Firm*—T. H. Whaley; C. G. Reis

[57] ABSTRACT

A two-stage ammonia absorption refrigeration system can be operated with at least three evaporators maintained at decreasing temperatures but only two pressures by separating two ammonia streams of different ammonia purities from the strong ammonia water solution produced by the two stages of ammonia absorption. The novel system shows advantages over a three-stage ammonia absorption system previously required for the operation of three evaporators at decreasing temperatures.

6 Claims, 2 Drawing Figures

3,817,050

TWO-STAGE AMMONIA ABSORPTION REFRIGERATION SYSTEM WITH AT LEAST THREE EVAPORATION STAGES

BACKGROUND OF THE INVENTION

This invention relates to a multi-stage ammonia absorption refrigeration system and more particularly to such a system wherein two ammonia vapor streams of different purities are separated from the ammonia water solution and, after condensation, are vaporized in at least three evaporators maintained at decreasing temperatures but only two pressures.

Many variations of the ammonia absorption refrigeration system have been developed or proposed to provide economical refrigeration especially in plants having waste heat, i.e., heat not sufficiently above ambient temperature to be useful for generating power or not needed for process heating. It is known that in cooling a fluid from ambient to a low temperature, say −40° F., the coefficient of performance of an ammonia absorption refrigeration system can be improved by using several evaporators operating at decreasing temperatures rather than a single evaporator at the low temperature. A plant with three evaporators operating at three different temperatures is presented in Refrigerating Engineering, issue of March 1953, by FIG. 4 on page 278. While the basic ammonia absorption refrigeration system has one pump for the ammonia water solution as its only moving component, the multi-stage system of the aforesaid FIG. 4 in Refrigerating Engineering requires three pumps as well as three absorbers.

A principal object of this invention is to provide a two-stage ammonia absorption refrigeration system with at least three evaporators operating at decreasing temperatures with only two pumps.

A further object is to provide a two-stage ammonia absorption refrigeration system having an improved coefficient of performance as well as a lesser number of moving components relative to a three-stage absorption system.

These and other objects and advantages of the invention will become apparent from the description which follows.

SUMMARY OF THE INVENTION

In accordance with this invention, a two-stage ammonia absorption refrigeration system having at least three evaporators with decreasing temperatures has been found advantageously operable at only two pressures by separating from the ammonia water solution two ammonia streams of increasing ammonia purities. This concept has now made it possible to operate the three or more evaporators with only two absorbers and two pumps.

BRIEF DESCRIPTION OF THE DRAWINGS

In the further description of the invention which follows, reference is made to the accompanying drawings, of which.

DESCRIPTION OF PREFERRED EMBODIMENTS

Figure 1:
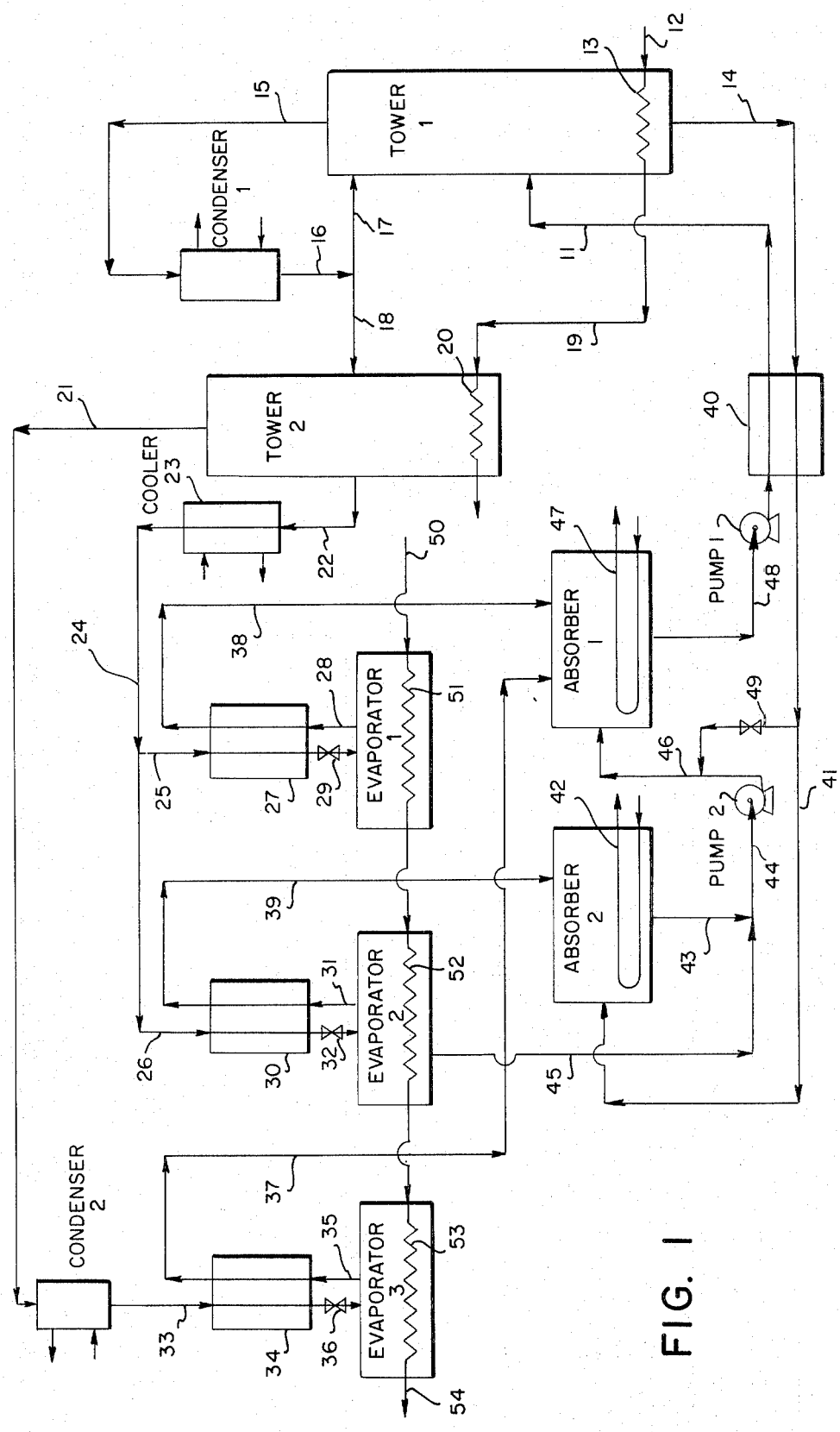
FIG. 1 is a schematic diagram of a two-stage ammonia absorption refrigeration system having three evaporators operating at decreasing temperatures with only two pumps.

The two-stage ammonia absorption refrigeration system of FIG. 1 has as its basic components separation towers 1 and 2, condensers 1 and 2, evaporators 1, 2 and 3, absorbers 1 and 2, and pumps 1 and 2. A weak aqueous solution of ammonia, hereinafter called weak aqua, is produced in tower 1 from a strong aqueous solution of ammonia, called strong aqua, which enters the middle section of tower 1 by way of pipe 11. Waste heat in the form, e.g., of process steam is supplied through pipe 12 to heating coil 13 in the bottom of tower 1; this heating generates ammonia vapor from the strong aqua and thus produces the weak aqua which leaves the bottom of tower 1 through pipe 14. Ammonia vapor passes from tower 1 through pipe 15 to water-cooled condenser 1. The operating pressure of tower 1 is set in relation to the temperature of the available cooling water used in condenser 1 so that substantially pure ammonia will be condensed. Thus, for cooling water supplied at a temperature of 60° F., tower 1 is maintained at a pressure of 156.5 psig (pounds per square inch gauge). A portion of the condensed ammonia, usually in the range of about 50 percent to 60 percent, flowing from condenser 1 in pipe 16 is returned through pipe 17 to the top of tower 1 as reflux liquid. The condensate in pipe 16 is high purity ammonia (HPA) containing about 0.2 percent of water on a molar basis.

The remaining major portion of the HPA is introduced into the middle section of separation tower 2 through pipe 18. Process steam leaving coil 13 is passed by pipe 19 into heating coil 20 in the bottom of tower 2 to generate a vapor of very high purity ammonia (VHPA) containing not more than 0.01 percent of water on a molar basis. VHPA flows from the top of tower 2 through pipe 21 to water-cooled condenser 2. The VHPA stream in pipe 21 is about 16.8 percent of the HPA stream entering tower 2 through pipe 18.

Liquid HPA with very slightly increased water content is withdrawn from the middle section of tower 2 and passed by pipe 22 through water-cooled cooler 23. Thence, the cooled liquid HPA flows through pipe 24 to supply pipes 25 and 26 on an approximately equal basis. The liquid HPA flowing through pipe 25 is further cooled in heat exchanger 27 by the countercurrent flow of vaporized HPA discharging from evaporator 1 through pipe 28. The further cooled liquid HPA is then passed through pressure-reducing or expansion valve 29 and introduced into evaporator 1. The liquid HPA flowing through pipe 26 is likewise further cooled in heat exchanger 30 by the countercurrent flow of vaporized HPA discharging from evaporator 2 through pipe 31. From heat exchanger 30, the liquid HPA is passed through expansion valve 32 and into evaporator 2. The pressure reduction through expansion valve 32 is greater than that through expansion valve 29 inasmuch as evaporator 2 is maintained at a lower pressure and thereby a lower temperature than the pressure and temperature of evaporator 1. The pressure in evaporator 1 is usually in the range of about 3 to 6 psi higher than that in evaporator 2.

Liquid VHPA flowing from condenser 2 through pipe 33 is cooled in heat exchanger 34 by the countercurrent flow of vaporized VHPA discharging from evaporator 3 through pipe 35. The cooled liquid VHPA is then passed through expansion valve 36 and introduced into evaporator 3. The pressure maintained in evaporator 3 is substantially the same as that in evaporator 1 but the temperature in evaporator 3 is lower than that in evaporator 1 and lower than even that in evaporator 2 because of the higher ammonia purity of VHPA compared to the ammonia purity of HPA.

Vaporized VHPA leaving heat exchanger 34 through pipe 57 and vaporized HPA leaving heat exchanger 27 through pipe 38, being at substantially the same pressure, discharge into absorber 1. Vaporized HPA passing at lower pressure through heat exchanger 30 and pipe 39 enters absorber 2. Weak aqua withdrawn from the bottom of tower 1 is passed by pipe 14 through heat exchanger 40 wherein it is cooled by the counterflowing strong aqua introduced into tower 1 by pipe 11. The cooled weak aqua flows through pipe 41 into absorber 2 wherein it is enriched in ammonia content by absorption of the vaporized HPA entering absorber 2 through pipe 39. The resulting heat of absorption is removed by passing cooling water through coil 42 in absorber 2. The enriched aqueous solution of ammonia discharges from absorber 2 through pipe 43 into inlet pipe 44 of pump 2.

Often, the vapor leaving evaporator 2 through pipe 39 will have a water content somewhat lower than that of the liquid HPA fed to evaporator 2 through expansion valve 32 so that a liquid bleed or purge stream must be withdrawn from evaporator 2; such purge stream is passed through pipe 45 into inlet pipe 44 of pump 2.

The aqueous solution of ammonia fed to pump 2 is pumped through pipe 46 into high pressure absorber 1. This ammonia water solution is enriched in ammonia by absorption of the ammonia vapors returned to absorber 1 by pipes 37 and 38. The resulting heat of absorption is removed by passing cooling water through coil 47 in absorber 1. The strong aqua thus produced flows from absorber 1 through pipe 48, pump 1, heat exchanger 40 and pipe 11 into tower 1 as previously mentioned. For greater flexibility and control of the operation of the refrigeration system, valved branch pipe 49 is provided to pass some weak aqua from pipe 41 to pipe 46 for discharge into absorber 1.

The process stream at ambient temperature to be cooled by the just described refrigeration system is passed by pipe 50 through the series of coils 51, 52 and 53, respectively, in evaporators 1, 2 and 3. The chilled process stream leaves the refrigeration system through pipe 54.

In an illustrative operation of the refrigeration system of FIG. 1, evaporators 1, 2 and 3 are at the decreasing temperatures of 20° F., −20° F. and −40° F., respectively. A process stream of substantially constant specific heat supplied through pipe 50 at a temperature of 86° F. is cooled to 26° F. in coil 51, to −14° F. in coil 52 and to −35° F. in coil 53. In such case, it is calculated that the refrigeration system removes approximately 0.80 BTU (British Thermal Unit) of heat from the process stream for each BTU of waste heat used. By comparison, it is calculated that for the same refrigeration duty the multi-stage absorption system of the aforesaid FIG. 4 in Refrigerating Engineering removes approximately 0.76 BTU of heat from the process stream for each BTU of waste heat consumed.

Figure 2:
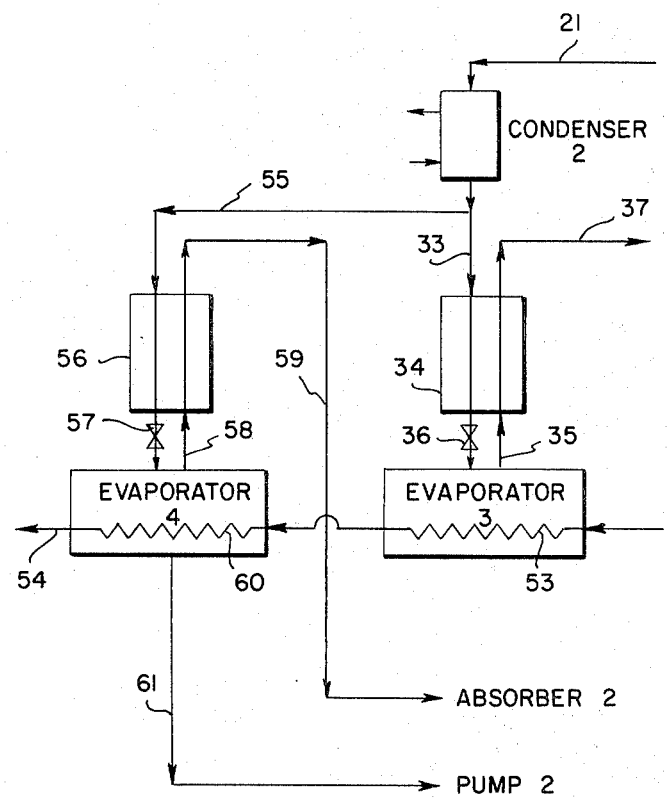
FIG. 2 is a similar but partial diagram showing the addition of a fourth evaporator to the refrigeration system of FIG. 1.

FIG. 2 shows the addition of evaporator 4 to the refrigeration system of FIG. 1. Part, say 50 percent, of the liquid VHPA flowing from condenser 2 in pipe 33 is passed through pipe 55, heat exchanger 56 and expansion valve 57 into evaporator 4. The pressure maintained in evaporator 4 is lower than that in evaporator 3 but substantially the same as that in evaporator 2. Hence, the temperature in evaporator 4 is also lower than that in evaporator 3. Ammonia vapor leaving evaporator 4 through pipe 58 passes through heat exchanger 56 to cool the counter-flowing liquid VHPA and thence flows through pipe 59 into absorber 2. The chilled process stream leaving coil 53 in evaporator 3 is further cooled by passage through coil 60 in evaporator 4. In some instances, the vapor discharging from evaporator 4 through pipe 58 may have a water content slightly lower than that of the liquid VHPA fed to evaporator 4 through expansion valve 57 so that a liquid purge stream must be withdrawn from evaporator 4. Pipe 61 is provided to pass such a purge stream from evaporator 4 to the inlet of pump 2.

For the same illustrative operation previously described in relation to the refrigeration system of FIG. 1, the temperature in evaporator 4 drops to −57° F. so that the process stream flowing through coil 60 discharges into pipe 54 at the low temperature of −51° F.

Variations of the two-stage ammonia absorption refrigeration system of this invention will be apparent to those skilled in the art without departing from the spirit or scope of the invention. For example, liquid HPA flowing in pipe 22 might be withdrawn directly from pipe 16 rather than from tower 2 as shown. Also, different fluids containing waste heat might be separately supplied to heating coils 13 and 20 in towers 1 and 2, respectivley, in lieu of the single stream passed in series through coils 13 and 20 as shown in FIG. 1. Likewise, two or more process streams might be chilled in the several evaporators without passing through the entire series of evaporators maintained at decreasing temperatures. Accordingly, only such limitations should be imposed on the invention as are set forth in the appended claims.

What is claimed is:

1. A two-stage ammonia absorption refrigeration system comprising a first separation tower for separating strong ammonia water solution into high purity ammonia and weak ammonia water solution, a first condenser to liquefy said high purity ammonia, a second separation tower for separating very high purity ammonia from said high purity ammonia, a first evaporator to receive part of said high purity ammonia after passage through a first pressure-reducing means, a second evaporator to receive the remainder of said high purity ammonia after passage through a second pressure-reducing means, a second condenser to liquefy said very high purity ammonia, a third evaporator to receive said very high purity ammonia after passage through a third pressure-reducing means, a first absorber to receive ammonia vapor from said first evaporator and from said third evaporator, a second absorber to receive ammonia vapor from said second evaporator, a pipe for the flow of said weak ammonia water solution from said first separation tower into said second absorber, a first pump to feed said strong ammonia water solution from said first absorber into said first separation tower, and a second pump to feed ammonia water solution from said second absorber into said first absorber.

2. The refrigeration system of claim 1 wherein first, second and third indirect heat exchangers are associated, respectively, with the first, second and third evaporators, each of said heat exchangers being connected for the countercurrent passage of the ammonia streams flowing to and from its associated evaporator.

3. The refrigeration system of claim 2 wherein an indirect heat exchanger is connected for the countercurrent passage of the weak ammonia water solution flowing from and the strong ammonia water solution flowing to the first separation tower.

4. The refrigeration system of claim 1 wherein a fourth evaporator is connected to receive part of the very high purity ammonia after passage through a fourth pressure-reducing means, and a pipe is connected for the flow of ammonia vapor from said fourth evaporator to the second absorber.

5. The refrigeration system of claim 4 wherein an indirect heat exchanger is connected for the countercurrent passage of the ammonia streams flowing to and from the fourth evaporator.

6. In the method of producing refrigeration comprising vaporization of liquid ammonia in two evaporation zones of decreasing pressure and temperature, absorption of the vaporized ammonia from said two evaporation zones in two corresponding absorption zones of decreasing pressure, passage of ammonia water solution from the absorption zone of lower pressure to the absorption zone of higher pressure and from said absorption zone of higher pressure to a generation zone for separating ammonia vapor from ammonia water solution, condensing said ammonia vapor and division of the resulting liquid ammonia into two streams discharging through pressure reducing devices, respectively, into said two evaporation zones, the improvement of vaporizing some liquid ammonia in a third evaporation zone of a temperature below the temperatures of said two evaporation zones which comprises separating from said liquid ammonia a portion of higher ammonia purity, passing said portion of high ammonia purity through a pressure reducing device, vaporizing said portion of higher ammonia purity in said third evaporation zone maintained at substantially the higher pressure of one of said two evaporation zones, and absorbing the vaporized ammonia from said third evaporation zone in said absorption zone of higher pressure.

* * * * *